United States Patent [19]

Holtz

[11] Patent Number: 4,634,407
[45] Date of Patent: Jan. 6, 1987

[54] SELF-TENSIONING BELT TIGHTENER

[75] Inventor: Glen D. Holtz, Redford, Mich.

[73] Assignee: Federal-Mogul Corporation, Southfield, Mich.

[21] Appl. No.: 765,011

[22] Filed: Aug. 12, 1985

[51] Int. Cl.⁴ .............................................. F16H 7/10
[52] U.S. Cl. .................................................... 474/112
[58] Field of Search .............................. 474/101, 112

[56] References Cited

U.S. PATENT DOCUMENTS

| 1,657,024 | 1/1928 | Morse | 474/112 |
| 1,686,672 | 10/1928 | Thompson | 474/112 X |
| 1,913,872 | 6/1933 | Dow | 474/112 |
| 2,575,313 | 11/1951 | Covert et al. | 474/112 X |
| 4,571,222 | 2/1986 | Brandenstein et al. | 474/112 |

FOREIGN PATENT DOCUMENTS 2043548 6/1971 Fed. Rep. of Germany ...... 474/112

Primary Examiner—James A. Leppink
Assistant Examiner—Frank H. McKenzie, Jr.
Attorney, Agent, or Firm—Robert F. Hess; Lawrence J. Shurupoff

[57] ABSTRACT

A compact belt tensioning device includes a double acting pawl which selectively engages opposed sets of ratchet teeth formed on a stationary mounting. The tensioning device is adapted to be preset in a tensioned state to facilitate installation and repair procedures and may be easily activated by manually releasing the pawl.

9 Claims, 4 Drawing Figures

SELF-TENSIONING BELT TIGHTENER

BACKGROUND OF THE INVENTION

1. Field Of The Invention

This invention relates generally to belt tensioning devices, and more particularly concerns a compact tensioning device adapted to be locked in a fixed position for ease of installation and repair.

2. Description Of Prior Developments

Belt tensioning devices are well known and exist in numerous forms. However, most conventional tensioning systems are of a relatively complex structure when considered in light of their simple function which is to apply a steady tension to a driven belt. Along with the relatively complex structure of most conventional belt tensioners comes a generally bulky construction which requires considerable mounting and operating space. With the trend toward smaller and more compact engines comes the demand for correspondingly more compact engine subsystems including belt tensioners.

While several known belt tensioners are designed with a somewhat compact structure, they are generally difficult to install. That is, upon mounting the tensioner to, for example, an engine block, the biasing force of the tensioner must be overcome in order to provide the necessary clearance for engaging the tensioning pulley with its mating belt. If the belt has not yet been installed, the biasing force of the tensioning device must still be dealt with when subsequently installing the belt. In either case, the biasing force of the belt tensioner is a bothersome factor which often complicates its installation. Moreover, should it become necessary to repair any of the components connected to the belt, or to remove or replace the belt for any reason, the tensioning device again becomes an annoying factor in the repair or replacement procedure.

Accordingly, a need has existed for a belt tensioner which is not only compact and simple in design, but which eliminates the bothersome need to overcome its biasing force during installation and repair. Consequently, the automotive industry has for some time sought a belt tensioner which would avoid such problems.

SUMMARY OF THE INVENTION

The present invention negates the prior art need to overcome the biasing force of a belt tensioning device during installation and repair by providing a prewound, preset belt tensioner which is of simple, compact construction, and which is provided with a double acting ratchet and pawl locking assembly. This locking assembly allows the belt tensioner to be preset during manufacture and locked in a predetermined biased position so that the need to overcome the biasing force of the tensioner during its installation is obviated. Once installed, the ratchet mechanism is released thereby allowing the belt tensioner to actively engage the belt with a predetermined force so as to further facilitate installation. Should repairs to the belt system be required, the belt tensioner may be returned to its preset position and locked in place until the repairs are completed, then released again into its operative position.

Accordingly, it is an object of this invention to provide a belt tensioning device having a simple, compact construction and which may be installed in its intended environment without the need for special tools.

Another object is to provide a belt tensioner which is adapted to be preset during manufacture so that its biasing force may be released after installation by simply releasing a ratchet and pawl mechanism.

Still another object is to provide a belt tensioner which, once installed and operating, may be returned to a locked position wherein the tension is removed from the belt during, for example, repair periods.

The realization of these objects and various other objects, features and attendent advantages of the present invention will be more fully appreciated from the following detailed description when considered in connection with the accompanying drawings, in which the same reference numbers designate the same or corresponding parts throughout.

DETAILED DESCRIPTION OF THE PREFERRED EMBODIMENT

Figure 1:
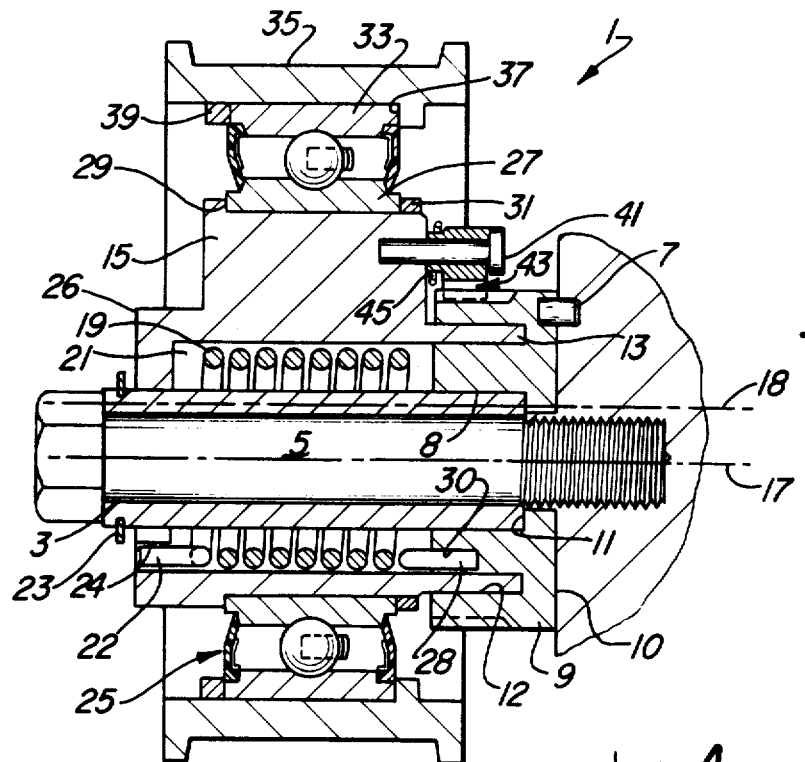
FIG. 1 which is a longitudinal cross-sectional view of a preferred embodiment of the tensioner showing the internal structure thereof, taken along line A—A of FIG. 2.

The belt tensioner developed in accordance with the present invention will now be described in conjunction with the accompanying FIGS. 1 and 2 within which it is seen that the tensioner system (1) is provided with a tubular mandrel (3) for receiving a bolt (5) threaded at one end for securely fastening the tensioning system to, for example, an engine block. In practice it has been found that bolt (5) is all that is required for anchoring the tensioning system against its mounting surface. Additional support may be provided by an anti-rotation pin (7) which serves the further purpose of a registration or alignment key for ensuring the proper positioning of the tensioning system during installation. When the anti-rotation pin is used, a recess must be provided in the engine mounting surface for receiving the pin.

The mandrel (3) is rigidly fixed within an axially extending cylindrical stepped recess (8) formed within a cup member (9) whose outer face (10) provides the mounting surface upon which the tensioning system is installed. The outer end portion of the cylindrical recess is provided with a shoulder (11) for axially anchoring the mandrel with a press fit within the cup. As an alternate simplified design, the anti-rotation pin may be formed homogeneously with the mandrel and the cup from, for example, a sintered powder metal material. It has been found that powder metal reduces the transmission of sound and thereby results in a quieter operation of the tensioner. Moreover, a one piece homogeneous cup and mandrel construction reduces the number of parts required and facilitates assembly.

Radially outwardly from the inner stepped recess and concentric therewith is formed an annular groove (12) for freely receiving with a clearance fit a tubular extension (13) of hub member (15). A clearance fit is needed in order to allow the hub to freely rotate within the groove (12) of cup (9). Cup (9) is securely fixed, when installed, against rotation by the fastening bolt (5). Groove (12) extends for a sufficient axial depth to allow a nesting of the tubular extension (13) within cup (9) so as to provide adequate support for the hub while minimizing the overall axial extent of the tensioning system. The nesting of the hub and cup is desirable for installing the system within tight limits where axial mounting space is limited. In fact, the extent of axial nesting of the tubular extension within groove (12) can be reduced to a point where the combined axial extent of the hub and cup is substantially the same as the axial width of the pulley. Alternatively, as noted above, the hub and cup could be formed homogeneously to obviate the need for nesting, thereby simplifying the design and allowing even further reduction of axial length since the cup need no longer provide nesting support for the mandrel.

As is conventional with many belt tensioners, the hub member is provided with an outer circular surface which is eccentric with respect to the longitudinal axis (17) about which the hub pivots. The eccentricity and offset of the coaxial central mandrel axis and hub pivot axis with the outer circular hub surface provides the necessary offset between their respective rotational centers to effect belt tightening.

In order to provide a more axial and radial compact tensioning system, torsion spring (19) is mounted over the tubular mandrel (3) and lies completely within the axial extent of the hub. An annular recess (21) is defined between the inner face of the hub member and the outer surface of the mandrel for providing the necessary clearance beween the spring and hub to ensure substantially contact free rotation therebetween. Contact is maintained between the spring and hub by one axially extending end portion (22) of spring (19) which fits within a recess or channel (24) provided in an outer end wall (26) of the hub. The opposite end portion (28) of spring (19) is fixed within a recess (30) formed in the inner face of the cup member. A retaining clip (23) may be provided on the mandrel for preventing the release of the inner hub from the mandrel and cup. A clearance fit is formed between the end wall (26) and the mandrel to allow the hub to freely rotate around the mandrel.

A bearing assembly (25) such as a ball or roller bearing is mounted over the outer circumferential surface of the inner hub member (15). The inner race (27) of the bearing assembly is rigidly fixed to the inner hub. Shoulder (29) is formed on the inner hub to provide an abutment and positioning surface for the bearing assembly. An inner hub retaining ring (31) may be provided to axially fix the inner race of the bearing assembly against shoulder (29).

The outer race (33) of the bearing assembly is fixed to the inner surface of pulley (35). A shoulder (37) is provided on the inner surface of the pulley for axially locating the outer race. A pulley retaining ring (39) is also provided for fixing the axial location of the outer race with respect to the pulley.

Pawl pivot pin (41) is rigidly fixed within a recess formed in the inner hub member (15). A double acting pawl (43) is pivotally mounted over the pawl pivot pin and is spring biased against the cup (9) by torsion spring (45). One end of torsion spring (45) is fitted within a recess formed in the inner hub member while the other end is hooked over a first dog member (47) of the double acting pawl. A second dog member (49) is provided on the opposite side of the double acting pawl from the first dog member for purposes explained below.

Figure 2:
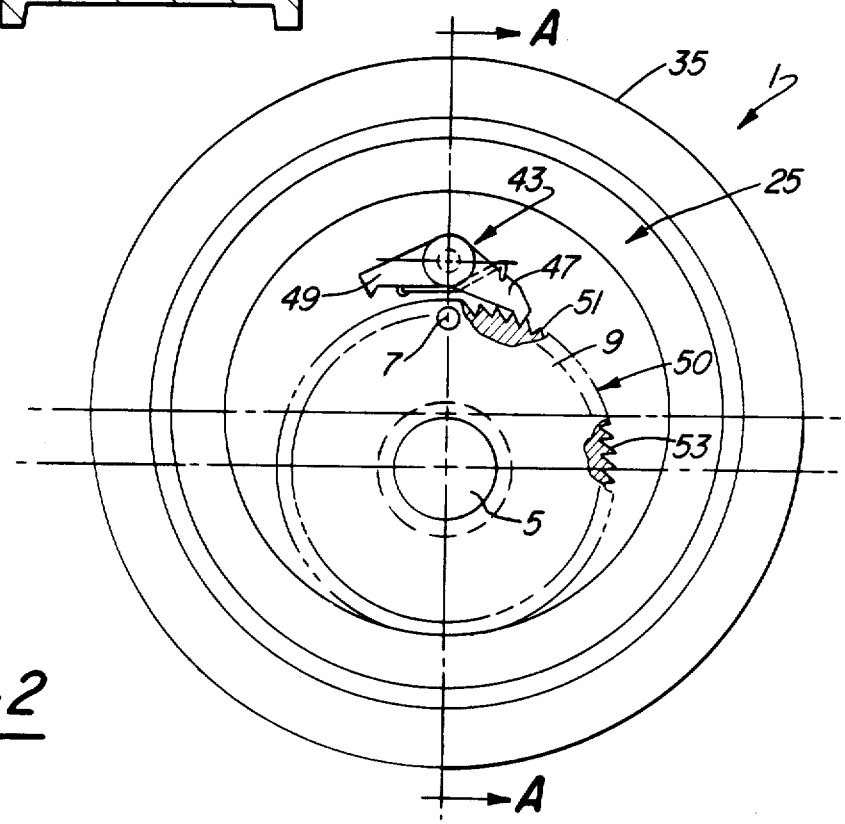
FIG. 2 which is a front elevational view of the tensioner in an operative mode.
Figure 3:
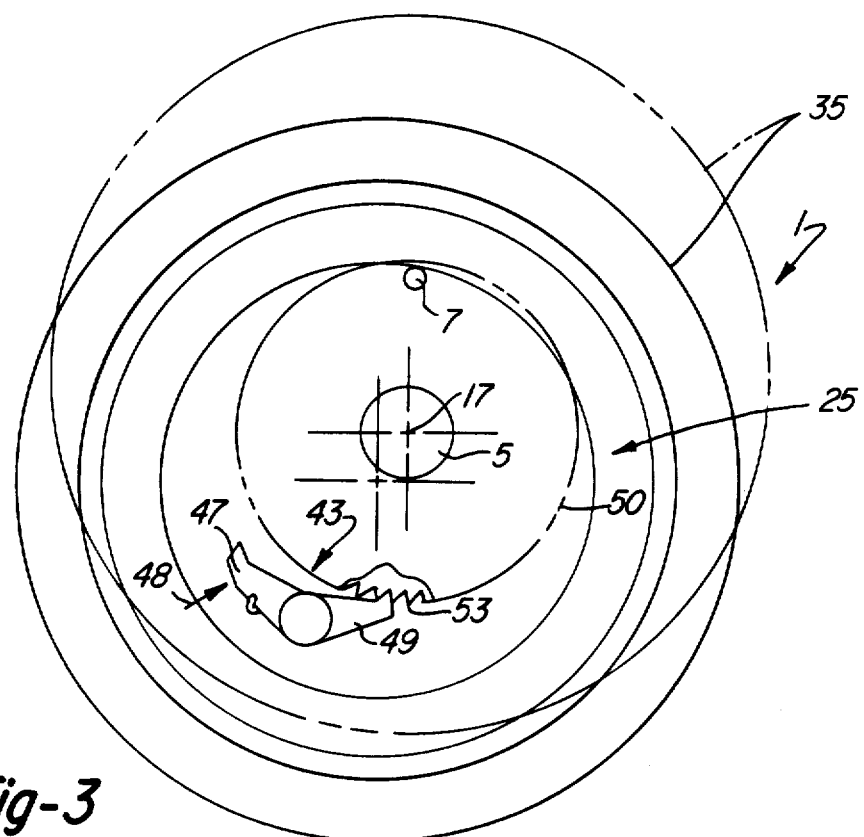
FIG. 3 which is a view similar to FIG. 2 showing the tensioner in its prewound state prior to installation.

As best seen in FIGS. 2 and 3, the outer circumference (50) of the cup (9) is provided with two sets of serrated ratchet teeth for selective engagement with the double acting pawl. A first set of ratchet teeth (51) is formed for preventing counterclockwise rotation of the hub via engagement with the first dog (47), while a second set of ratchet teeth (53) is provided for preventing a clockwise rotation of the hub via engagement with the second dog (49). The first and second sets of ratchet teeth may be separated by a smooth toothless surface extending over, for example, 90 degrees of arc for facilitating release of the preset tensioning system as discussed further below.

Figure 4:
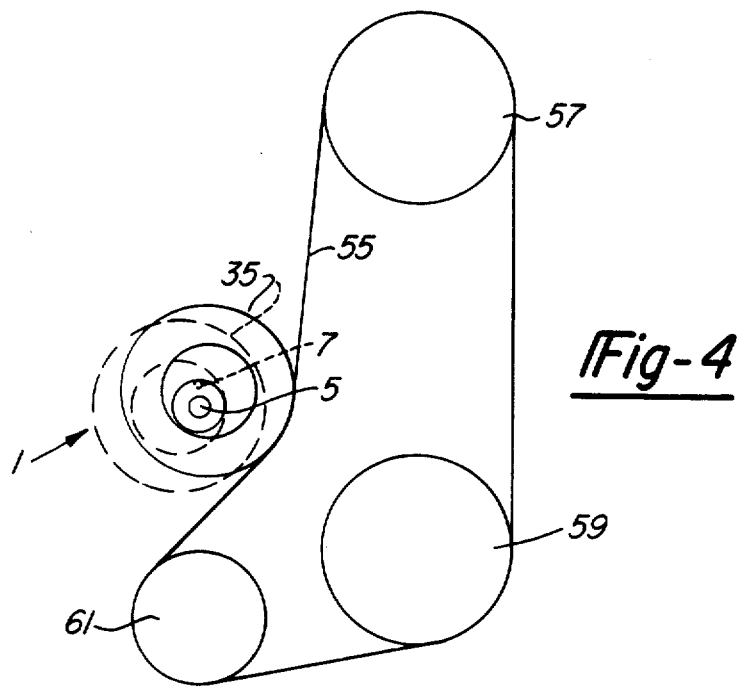
FIG. 4 which is a schematic diagram of the tensioner showing its replacement in an installation or repair position and in a running position.

The purpose of the double acting pawl and coacting opposed sets of ratchet teeth is primarily for facilitating installation and repair of the tensioning system within its intended operating environment, typically an automobile engine. As shown in FIG. 4, a typical application for the tensioning system is for properly tensioning a timing belt (55) over a plurality of rotating members such as camshaft pulley (57), distributor pulley (59) and crankshaft pulley (61). It can be appreciated that installation of the tensioning device can involve a somewhat complex and bothersome procedure if the biasing force of the torsion spring (19) is not in some way counteracted during installation.

That is, in practice it has been found difficult to simultaneously mount the tensioning system to, for example, an engine block while manually applying the necessary biasing force to deflect either the tensioning pulley (35) or the timing belt sufficiently to provide the pulley (35) the necessary clearance for installation. Trying to fasten bolt (5) to a mounting surface such as an engine block, while at the same time twisting the pulley (35) with sufficient torque to overcome the biasing force of torsion spring (19) requires considerable effort and dexterity. The difficulty of this installation procedure is virtually eliminated by the double acting pawl and coacting ratchet teeth of the present invention.

As seen in FIG. 4, the installation position of the tensioning system (1) is represented in phantom. In this position, the tensioning system is prewound and preset so that the second dog (49) engages the second set of ratchet teeth (53) thereby maintaining the torsion spring in a loaded or biased state. This preset or installation condition is further shown in FIG. 3. When installed in this condition, the outer circumference of the pulley (35) is provided with ample clearance from the timing belt (55) so that little or no force is needed to engage the pulley (35) with the timing belt. Moreover, there is no need to provide a biasing force for twisting the pulley away from interference with the timing belt during installation.

Simply put, the tensioning system is bolted to its mounting surface while locked in a tensioned state, and once installed, a slight force is applied to the first dog member (47) in the direction of arrow (48) shown in FIG. 3 to pivot it towards the cup member (9), thereby disengaging the second dog member from the second set of ratchet teeth. This release of the dog (49) from the second set of ratchet teeth allows the torsion spring to rotate the hub and pulley about the pivot axis (17), which is typically the longitudinal axis of bolt (5). In this manner, the pulley (35) can be engaged with the timing belt with a predetermined force, and is prevented against disengagement from the timing belt by the engagement of dog (47) with the first set of ratchet teeth (51). Once released into an operative position, the dog (47) and ratchet teeth (51) function in a conventional manner.

Should it subsequently become necessary to remove the tension belt (55) for any reason, the pulley (35) may be pivoted away from the belt by depressing dog (49) toward the cup (9) to release dog (47) from teeth (51). Pulley (35) may then be manually disengaged from the belt and locked in its original preset position (as shown in FIG. 3) until maintenance, repair or replacement procedures are completed. When it is desired to return the pulley to its operative position, dog (47) is depressed thereby releasing dog (49) allowing the torsion spring to bias the pulley against the belt. Thus, the belt tensioner need not be removed for such procedures, and no tools are needed to remove the tensioner from engagement with the belt. All that is required is a simple manual twist.

Obviously, numerous modifications and variations of the present invention are possible in the light of the above teachings. It is therefore to be understood that within the scope of the appended claims, the invention may be practiced otherwise than as specifically described herein.

What is claimed is:

1. A compact apparatus for tightening a belt or a chain comprising:
    a stationary mandrel;
    a cup member rigidly fixed to a portion of said mandrel;
    an eccentric hub member rotatably associated with said cup member for eccentric rotation about said mandrel;
    a torsion spring mounted over said mandrel and having one end portion fixed to said cup member and an opposite end portion fixed to said hub member for rotatably biasing said hub member about said mandrel;
    a tensioning pulley rotatably connected to said hub member such that said torsion spring urges said pulley into engagement with said belt or said chain; and
    pawl means provided on said hub member and ratchet means provided on said cup member for selectively engaging said pawl means and for preventing rotation of said hub member in at least one direction around said mandrel.

2. The apparatus of claim 1 wherein said hub member is formed with a cylindrical cavity which defines an annular space around said mandrel for receiving said torsion spring.

3. The apparatus of claim 1, further comprising bearing means for rotatably connecting said pulley to said hub member.

4. The apparatus of claim 1 wherein said pulley, said hub member and said cup member each comprises a predetermined axial width and wherein the axial width of said pulley is approximately the same as the combined assembled axial width of said hub member and said cup member, for minimizing the axial extent of said apparatus.

5. The apparatus of claim 1 wherein said pawl means comprises a double acting pawl having a pair of opposed dog members for selectively engaging said ratchet means.

6. The apparatus of claim 1 wherein said ratchet means comprises opposed sets of ratchet teeth for selectively engaging said pawl means.

7. A belt tensioner, comprising:
    stationary mounting means for mounting said tensioner to a support surface;
    a hub rotatably and eccentrically connected to said mounting means;
    a pulley rotatably connected to said hub; and
    a double acting ratchet and pawl assembly operatively associated with said hub and with said mounting means for selectively preventing rotation of said hub about said mounting means.

8. The tensioner of claim 7 wherein said double acting ratchet and pawl assembly comprises a first dog member for preventing counterclockwise rotation of said hub member and a second dog member for preventing clockwise rotation of said hub member.

9. The tensioner of claim 8 wherein said double acting ratchet and pawl assembly further comprises a first set of ratchet teeth for engagement with said first dog member and a second set of ratchet teeth for engagement with said second dog member.

* * * * *

UNITED STATES PATENT AND TRADEMARK OFFICE
CERTIFICATE OF CORRECTION

PATENT NO. : 4,634,407
DATED : January 6, 1987
INVENTOR(S) : Glen D. Holtz

It is certified that error appears in the above-identified patent and that said Letters Patent is hereby corrected as shown below:

Column 2, line 28 "replacement" should read "placement".

Signed and Sealed this

Eighth Day of September, 1987

Attest:

DONALD J. QUIGG

Attesting Officer

Commissioner of Patents and Trademarks